(12) United States Patent
Newhan (10) Patent No.: US 11,124,037 B2
(45) Date of Patent: Sep. 21, 2021

(54) VEHICLE OVERLOAD SUSPENSION SYSTEM

(71) Applicant: Mark Brendan Newhan, Lakeside, CA (US)

(72) Inventor: Mark Brendan Newhan, Lakeside, CA (US)

( * ) Notice: Subject to any disclaimer, the term of this patent is extended or adjusted under 35 U.S.C. 154(b) by 145 days.

(21) Appl. No.: 16/506,842

(22) Filed: Jul. 9, 2019

(65) Prior Publication Data

US 2020/0009934 A1 Jan. 9, 2020

Related U.S. Application Data

(60) Provisional application No. 62/695,636, filed on Jul. 9, 2018.

(51) Int. Cl.
*B60G 11/38* (2006.01)
*B60G 17/017* (2006.01)
*B60G 17/033* (2006.01)
*B60G 17/027* (2006.01)

(52) U.S. Cl.
CPC ....... *B60G 17/017* (2013.01); *B60G 17/0275* (2013.01); *B60G 17/0277* (2013.01); *B60G 17/033* (2013.01)

(58) Field of Classification Search
CPC .......................... B60G 17/017; B60G 17/0277; B60G 17/033; B60G 11/183; B60G 11/20; B60G 11/04; B60G 17/0275; B60G 11/10; B60G 2202/134; B60G 2202/112; B60G 2204/122; B60G 2202/20

USPC ......... 280/124.13, 124.152, 124.163, 124.17
See application file for complete search history.

(56) References Cited

U.S. PATENT DOCUMENTS

| | | | | |
|---|---|---|---|---|
| 6,019,384 | A * | 2/2000 | Finck | B60G 11/125 267/260 |
| 6,378,881 | B2 * | 4/2002 | Stenvall | B60G 3/06 280/124.171 |
| 2002/0079665 | A1 * | 6/2002 | VanDenberg | B60G 17/0277 280/124.106 |
| 2005/0127632 | A1 * | 6/2005 | Gehret | B60G 21/051 280/124.13 |
| 2011/0175314 | A1 * | 7/2011 | Ohra-Aho | B60G 21/051 280/124.106 |
| 2017/0305225 | A1 * | 10/2017 | Soles | B60G 11/04 |
| 2019/0023152 | A1 * | 1/2019 | Hintzen | F16H 48/36 |
| 2019/0061455 | A1 * | 2/2019 | Buchwitz | B60G 9/00 |

* cited by examiner

*Primary Examiner* — Toan C To
(74) *Attorney, Agent, or Firm* — Donn K. Harms (57) ABSTRACT

An overload suspension system configured for operative engagement to a vehicle having a first leaf spring and second leaf spring to provide auxiliary support to the vehicle when overloaded. A first control arm attached to a first torsion bar has a distal end positioned a separation distance from the first leaf spring. A second control arm attached to the second control arm has a distal end positioned substantially the same separation distance from the second leaf spring. The suspension system operates as an auxiliary suspension only when added weight to the vehicle deflects both leaf springs to contact a respective one of the control arms, thereby preserving the ride and suspension characteristics of the vehicle when the added weight is not present.

7 Claims, 5 Drawing Sheets

VEHICLE OVERLOAD SUSPENSION SYSTEM

This application claims priority to U.S. Provisional Patent application Ser. No. 62/695,636 filed on Jul. 9, 2018.

FIELD OF THE INVENTION

The present device relates to motorized vehicle suspensions. More particularly, the disclosed device and system relate to an auxiliary suspension system for a motor vehicle configured to provide an overload spring for leveling and controlling the vehicle only when heavy loads are carried by such motor vehicles and thereby does not interfere with the factory-engineered wheel travel, spring rate and vehicle ride during normal use when it is not overloaded.

BACKGROUND OF THE INVENTION

Since the invention of motorized vehicles, they have been employed for transporting freight and heavy loads. Modernly, vehicles such as pickup trucks and sport utility vehicles are frequently employed commercially, as well as by homeowners, to transport varying types of materials which communicate weight and a load to the vehicle suspension system. Most such vehicles are engineered for this purpose with springs and dampeners such as shock absorbers, allowing the transport of loads of materials up to a weight anticipated by the factory design.

However, owners of such vehicles, especially where used for commercial purposes such as construction, or for trailer towing, will on many occasions seek to carry a load, or engage a trailer with a tongue weight, which will exceed the weight load for which the vacuole was engineered. As is well known, loading such vehicles with materials or with an engaged trailer, having a weight exceeding the designed vehicle load weight, will cause the vehicle to sag at the rear.

Such overloading causes safety issues for the driver in that overloading the vehicle to a point causing the rear to droop will impart lift to the front of the vehicle causing significant under-steering. Further, where the load significantly exceeds the vehicle weight design, such can result in damage to the suspension system.

Conventionally, there are marketed a number of devices and systems which are engageable with a vehicle which will enhance the weight load the vehicle can carry. One popular system employs air bags which engage between the vehicle chassis and existing springs. Increasing the air pressure in such air bags inflates and elongates them to absorb the increase in weight load. Other systems are available which employ additional leaf springs which engage existing springs, air shocks which work similar to air bags, and pliable cylinders which engage between the vehicle frame and the axle.

While such systems are available at a reasonable cost and work to offset additional weight loads, they do not work well in combination with the factory-engineered suspension system, as they limit the unencumbered wheel travel over the road and bumps, and once engaged the extra resistance communicated continually to the vehicle suspension makes for a rough ride.

A significant issue with conventional auxiliary suspension systems occurs because manufacturers spend countless engineering hours developing vehicle suspensions which are designed for an estimated weight load, as well as for driver comfort. This engineering results in vehicles which are provided from the factory with specific resistance to travel of the wheels between the road and the vehicle axle. This factory-engineered wheel travel is adapted to provide a reasonably comfortable and less than stiff ride for the occupants.

To this goal of providing load handling, as well as riding comfort, the springs and suspension engineered and provided by the factory designed for an increase in rate of resistance to travel of the wheel, which is the purpose and function of a spring of such suspensions. Such springs can vary greatly in resistance to movement imparting resistance to wheel travel toward the chassis and are engineered with the weight bearing ability of the vehicle in mind as well as the comfort of the occupants. For example, where such a spring is designed to have a rate of 200 pounds per inch of compression along a travel distance of seven inches, then a force of substantially 1400 pounds communicated to the wheel will compress the spring to the point where the suspension movement is stopped or "bottoms out".

Conventionally available auxiliary suspension systems, to increase weight handling as noted above, once installed, work full time to provide additional resistance to travel at all weight loads. Once engaged they generally inhibit the total travel of the wheel, and in the example of a designed travel of seven inches noted above, the addition of an auxiliary suspension will cause that limit to decrease by as much as half or more.

This engagement of such conventional systems in a fashion where they work continuously, causes at least two negative issues on the vehicle to which they are installed. First, continuous engagement to the existing suspension of additional resistance to wheel travel causes the ride of the vehicle to become rough since it is not using the lesser resistance and longer wheel travel designed by the manufacturer for comfort. Second, in the case of air suspension, the air bag spring rate is only controlled by the factory shock absorber mounted between the vehicle frame and the axle. Thus, the vehicle suffers a loss of the factory-engineered wheel travel and an excessive amount of air spring rate which is difficult to control and a significant impact to ride comfort.

The system herein, employing two torsion bars which are each actuated only upon a delayed contact of a control arm with the factory springs, solves these issues. It does so by providing extra resistance to wheel travel only when weight is added to the vehicle sufficient to cause contact of the control arms with the vehicle leaf springs. Further, each torsion bar is in operative engagement with a respective hydraulic dampener such as a shock absorber, which provides the additional dampening to the movement and rebound of each torsion bar, thereby allowing the vehicle shock absorbers to control the leaf spring movement as designed, without having to also control that of the auxiliary suspension components.

The forgoing examples of vehicle auxiliary suspension systems and the limitations related therewith, are intended to be illustrative and not exclusive. The disclosed examples and background herein does not imply any limitations on the invention described and claimed herein. Various other limitations of the related art of vehicle suspension are known, or such will become apparent to those skilled in the art upon a reading and understanding of the specification below and the accompanying drawings.

SUMMARY OF THE INVENTION

The device and system herein disclosed and described provides a solution to the shortcomings in prior art in the area of auxiliary suspension systems for motor vehicles. The system, in all modes herein disclosed, employs two torsion bar suspension components each having a control arm operatively engaged to one end. Each of the two torsion bars is operatively engaged with the frame of the vehicle. In use, so engaged, the rotation of the respective torsion bar by an operatively engaged control arm contacting the vehicle leaf spring, will cause increasing resistance to such rotation and an exertion of force to the control arms in an opposite direction of their initial rotation.

Particularly preferred in all modes of the system herein, the distal end of each of the two torsion bars is held out of contact with the vehicle leaf spring by the distance of a gap therebetween. Such is accomplished by preventing rotation of the torsion bar and the control arm, engaged thereon, past a default position where the distal end of the control arm is spaced a distance from the leaf spring on the vehicle which is aligned with the plane of rotation of the control arm.

Upon the over loading of the vehicle to a point where the two leaf springs move toward and contact, the distal end of the respective control arm with which they align, further deflection of the leaf springs will be resisted. This resistance is imparted by the force exerted by the respective torsion bar to the respective control arm and the resistance to rotation of that control arm. In this fashion, the system herein provides additional resistance to deflective movement of the weight-bearing leaf springs, to accommodate a weight load in the vehicle exceeding that for which each leaf spring is designed.

The system, unlike conventional auxiliary suspensions, by maintaining the control arms in positions which are distanced from the respective leaf spring to which they align when the vehicle has not been loaded with weight exceeding the factory suspension ability, does not increase the resistance of the leaf springs to movement and the wheel travel. Such results in the smooth ride of the vehicle for which it was designed.

Further, by providing hydraulic dampeners such as shock absorbers operatively engaged to each of the torsion bars such as with mounting bars, the system herein does not impact the stock vehicle shock absorbers to resist the torsion spring movement and force. Instead the auxiliary hydraulic dampeners or shock absorbers provided with the system are operatively engaged and engineered to provide the necessary dampening only to the force exerted from the torsion bars.

With respect to the above description, before explaining at least one preferred embodiment of the auxiliary vehicle suspension system disclosed and described herein in detail, it is to be understood that the disclosed suspension invention is not limited in its application to the details of construction and to the arrangement of the components in the following description or illustrated in the drawings. The auxiliary suspension system herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other vehicle auxiliary suspension systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. Further, by the term substantially is meant, unless otherwise specifically defined, plus or minus ten percent.

It is an object of the present invention to provide an auxiliary vehicle suspension system which is configured for operation only when the vehicle exceeds a designed weight load thereby preserving vehicle ride and handling characteristics when not over loaded.

It is a further object of the invention to provide such an auxiliary vehicle suspension which allows for substantially full wheel travel once engaged and includes dampening for the auxiliary torsion bars employed and thereby avoid impacting the work required of the OEM vehicle shock absorbers.

It is a further object of this invention to provide such an auxiliary suspension system which can be adjusted for a particular amount of weight overload by adjusting the timing of activation through the adjustment of distance for contact with the leaf springs.

These and other objects, features, and advantages of the disclosed overload auxiliary suspension system invention, as well as the advantages thereof over existing prior art, which will become apparent from the description to follow, are accomplished by the improvements described in this specification and hereinafter described in the following detailed description, which fully discloses the invention, but should not be considered as placing limitations thereon.

BRIEF DESCRIPTION OF DRAWING FIGURES

The accompanying drawings, which are incorporated herein and form a part of the specification illustrate some, but not the only or exclusive examples of embodiments and/or features of the disclosed auxiliary vehicle suspension system. It is intended that the embodiments and figures disclosed herein are to be considered illustrative of the invention herein, rather than limiting in any fashion.

In the drawings.

DETAILED DESCRIPTION OF THE INVENTION

In this description, the directional prepositions of up, upwardly, down, downwardly, front, back, top, upper, bottom, lower, left, right and other such terms of direction or position, refer to the device as it is oriented and appears in the drawings and are used for convenience only, and such are not intended to be limiting or to imply that the device has to be used or positioned in any particular orientation.

Figure 1:
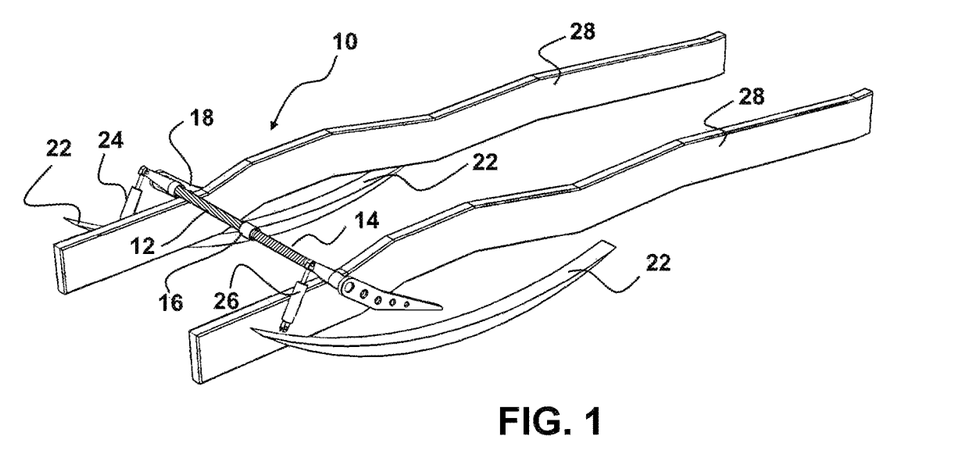
FIG. 1 depicts the system herein in a perspective view showing the two torsion bars engaged with respective control arms adapted to contact existing vehicle leaf springs once the leaf springs deflect to close a gap, and also showing hydraulic dampeners engaged to control movement of each torsion bar.
Figure 2:
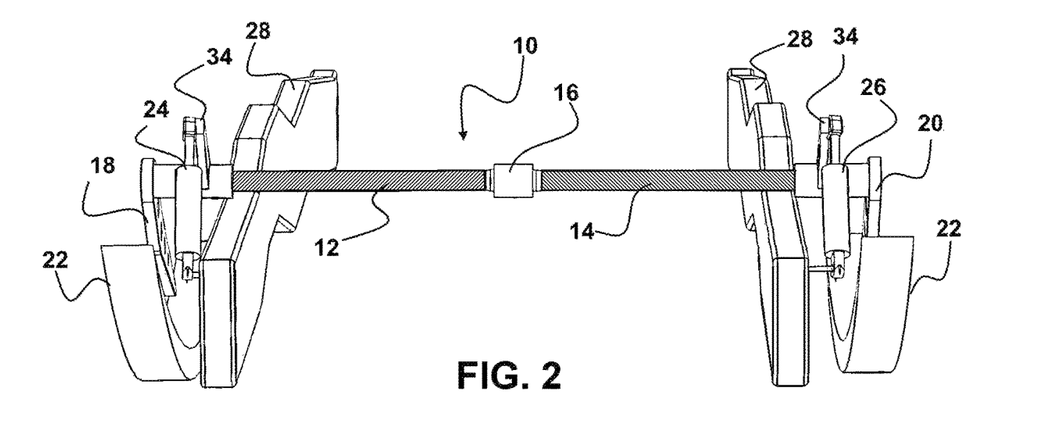
FIG. 2 shows a closer view of the device as in FIG. 1 from a rear view.

Now referring to drawings in FIGS. 1-9 wherein similar components are identified by like reference numerals, there can be seen in FIGS. 1-2 a first depiction of the system 10 herein. The system 10 shown in FIGS. 1-2 is substantially the same as in FIGS. 3-4. However, in FIGS. 1-2 it is shown without a support member, and it is assumed the system is operatively engaged with a vehicle of choice either at manufacture or using other support members or components.

Figure 7:
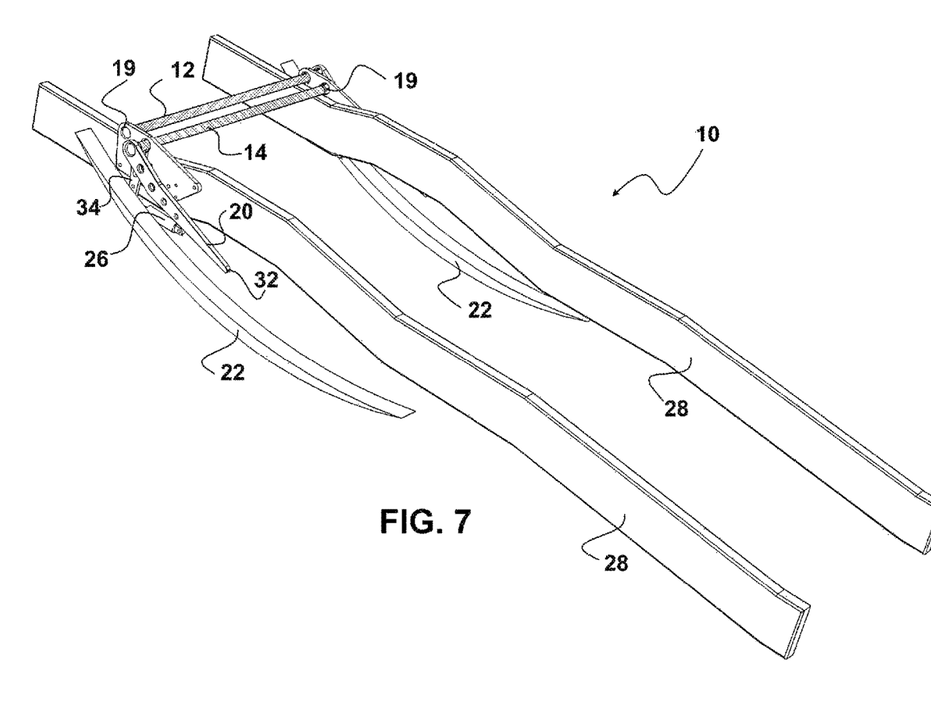
FIG. 7 depicts a perspective view of the system herein employing torsion bars extending between opposing members of the vehicle frame which operates on the same fashion.
Figure 8:
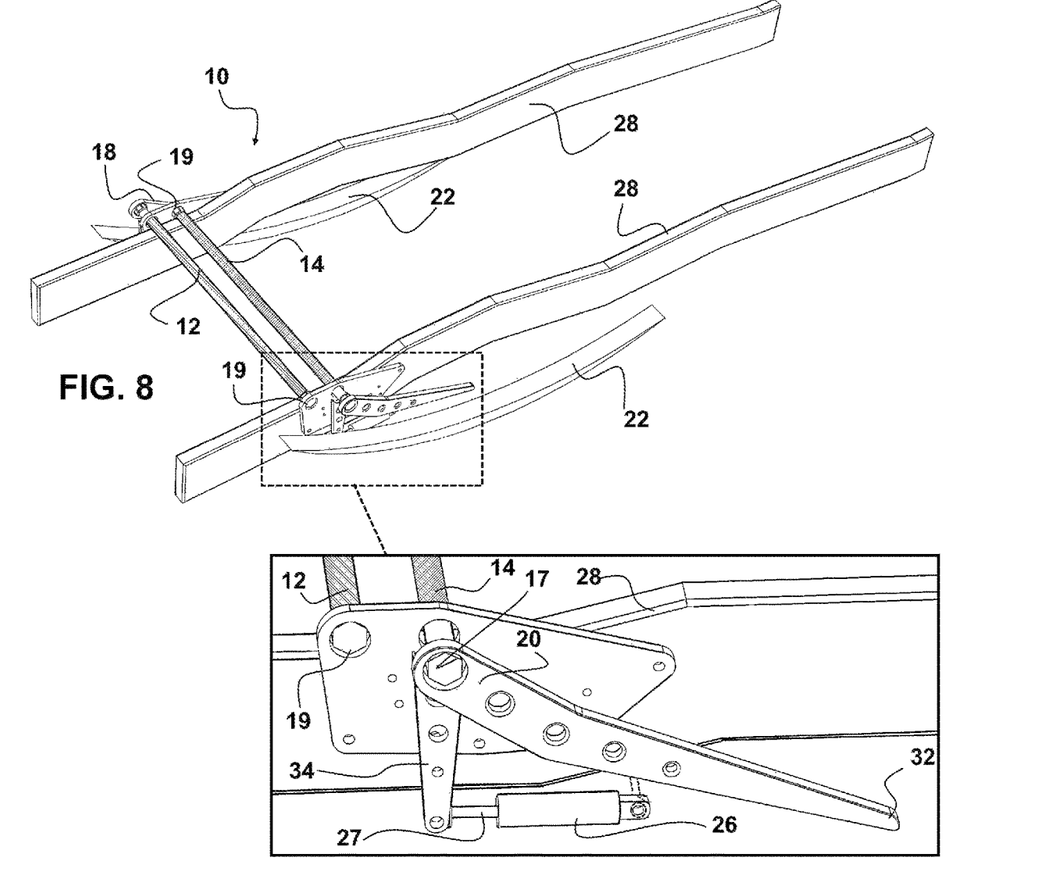
FIG. 8 shows the system herein of FIG. 7 in an opposite perspective view and depicts an enlarged view of a portion of the system.
Figure 9:
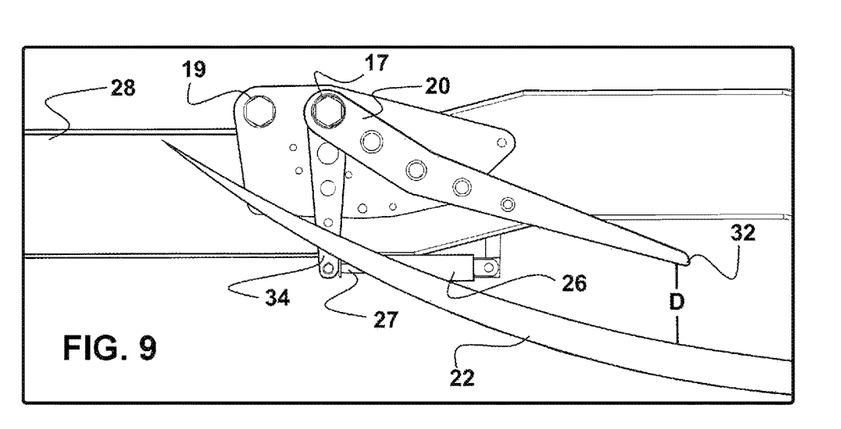
FIG. 9 shows a plan view of the enlarged portion of FIG. 8 depicting the system in non operative mode where the leaf spring has not deflected the distance required to contact the respective control arm which communicates resistance from an engaged torsion bar.

As shown in FIGS. 1-2, the system 10 in all preferred modes herein, includes a first torsion bar 12 adjacent a second torsion bar 14 having a fixed engagement at one end to the vehicle frame or body such that one end of each torsion bar 12 and 14, is in such a fixed engagement to resist rotation. Such may be any fixed engagement of one end of each torsion bar 12 and 14, such as a center mount 16 therebetween engaged to a static or fixed connection with the vehicle, or as shown in FIGS. 7-9, at frame mounts 19, in a fixed connection to the vehicle such as to the frame 20 or the uni-body where no frame 20 is present. By the term fixed connection, at either a frame mount 19 or center mount 16 is meant, that the respective torsion bar 12 and 14, is connected and prevented from rotation by the fixed connection.

In all modes of the system 10 herein, the first torsion bar 12 and second torsion bar 14 are configured for independent twisting and increasing resistance to such twisting. Such torsion bars 12 and 14 would be formed of metal adapted for ongoing twisting and resistance thereto or could be made from other materials such as carbon fiber and polymeric materials.

In all modes of the system 10 herein, operatively engaged adjacent a distal end of the first torsion bar 12 from the fixed connection of an attachment end, is a first control arm 18. This control arm 18 is configured to rotate during twisting of the first torsion bar 12 in a plane aligned with the existing factory leaf spring 22 located and aligned therewith. Operatively engaged at or adjacent the distal end of the second torsion bar 14 is a second control arm 20 positioned thereon to rotate in a plane aligned with the second of the existing vehicle leaf springs 22.

Also depicted in FIGS. 1-9, are a first hydraulic dampener 24 operatively engaged with the first torsion bar 12 to dampen movement thereof as well as a second hydraulic dampener 26 operatively connected to the second torsion bar 14 to dampen spring movement thereof as well. As noted, the inclusion of auxiliary dampeners 24 and 26 removes any dampening load requirements from the factory-installed shock absorbers as to the forces imparted by the torsion bars. The term hydraulic dampener as used herein is for convenience and is meant to include hydraulic dampeners such as shock absorbers and other mechanical and/or pneumatic components known by those skilled in the art which are adapted to absorb energy of the force of the torsion bars moving between loaded and unloaded positions.

Figure 3:
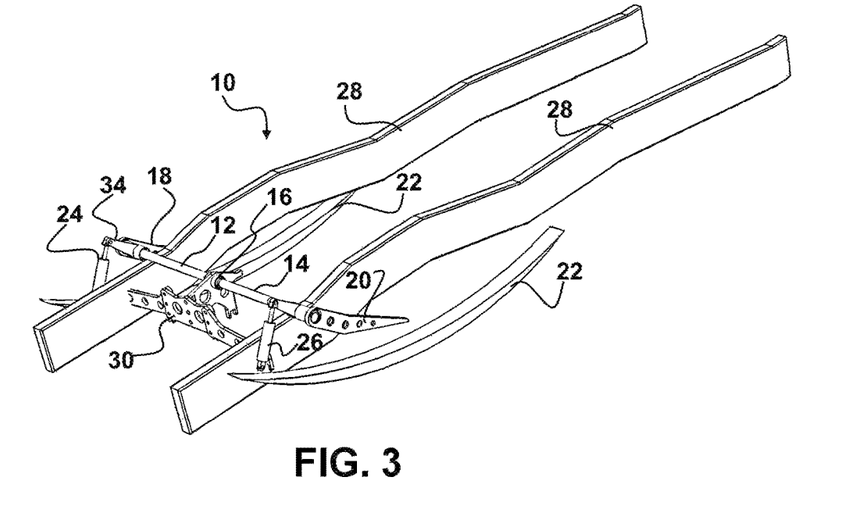
FIG. 3 shows the system herein in a similar configuration as noted in FIG. 1 and also showing a support member engaged between vehicle frame rails for operative engagement of the two torsion bars.
Figure 4:
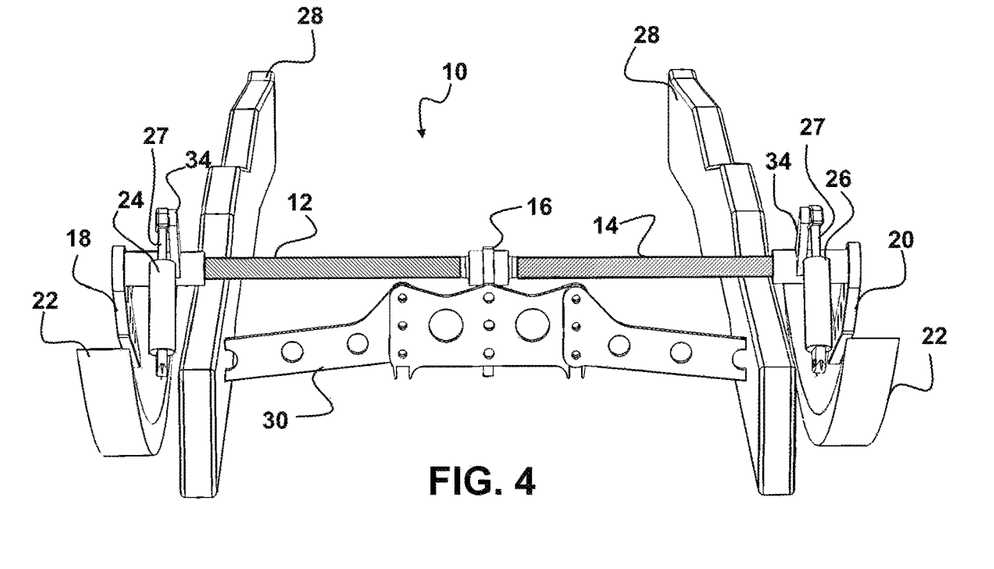
FIG. 4 shows a closer view of the system as in FIG. 3 from a rear view showing the system engaged between the existing vehicle frame rails and operatively positioned for contact of control arms with respective aligned leaf springs.

A similar configuration of the system 10 noted in the description as to FIGS. 1-2 is shown in FIGS. 3-4 where the system 10 is engaged with a vehicle having existing leaf springs 22 operatively engaged between axles (not shown but well known) and the frame 28. As shown in FIGS. 3-4 a support member 30 is included with the system 10 which is adapted to engage with the frame 28. The support member 30 so engaged, is connected to the center mount 16 to support it and provide operatively engaged in fixed connections to the respective engagement ends of the first torsion bar 12 and second torsion bar 14.

Figure 5:
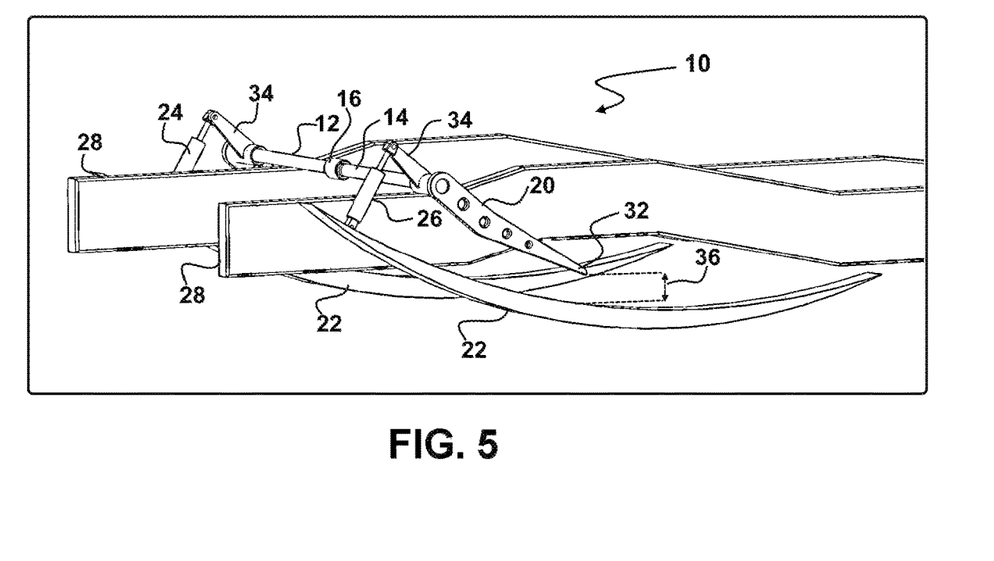
FIG. 5 depicts an enlarged view of one control arm operatively engaged at the distal end of one torsion bar and showing the hydraulic dampener connected to dampen torsion bar movement as well as the default position of the distal end of the control arms spaced from the leaf spring to which it is aligned.
Figure 6:
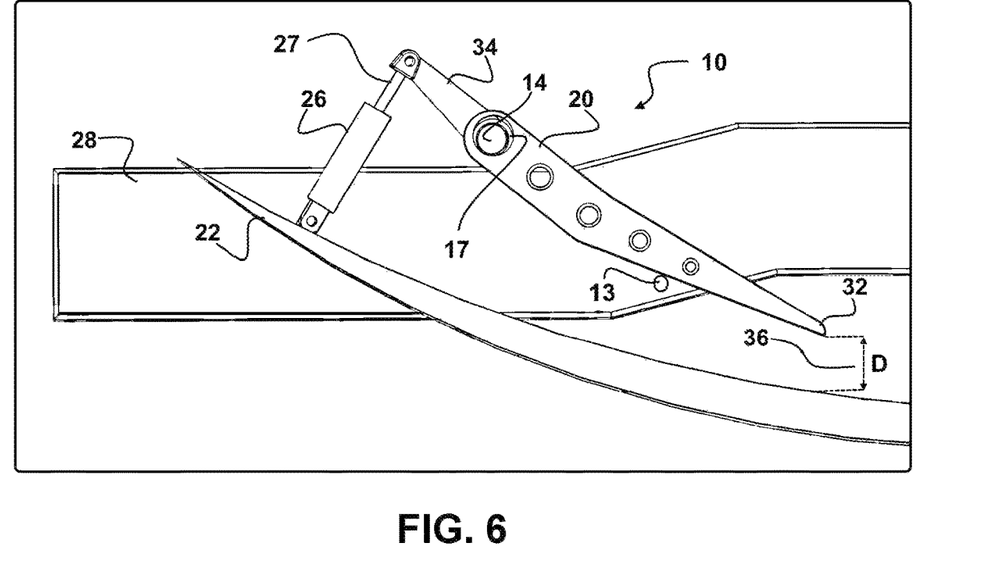
FIG. 6 shows a closer view of the system as in FIG. 5.

In FIGS. 5-6 are shown enlarged view of the operative components of the system 10. While described as to the operation of the second control arm 20 and second torsion bar 14 and second hydraulic dampener 26, the first torsion bar 12 and first control arm 18 and first hydraulic dampener 24 operate exactly the same.

The second hydraulic dampener 26 is in operative connection at with the second torsion bar 14. The opposite end of the second hydraulic dampener 26, is connected at a fixed engagement point, such as engaged with the existing vehicle frame 28 or body or connector thereto.

As depicted, the second hydraulic dampener 26 is operatively engaged to the second torsion bar 14, such as a connection of the translating dampening shaft 27 with a mounting member 34 which is connected to the torsion bar 14. Such an engagement is preferred as the length of the mounting member 34 or the connection point of the hydraulic dampener 26 thereon, can be adjusted to provide more or less leverage to thereby increase or lessen the dampening force exerted by the hydraulic dampener 26.

As noted, the two hydraulic dampeners 24 and 26 are preferred since they are employed to dampen the movement and spring force exerted by the twisting and rebound of both of the two torsion bars 12 and 14 when the system 10 is operable during contact of the control arms 18 and 20 with respective aligned leaf springs 22. Such leaves the factory installed shock absorbers free to dampen leaf spring travel.

As shown in FIG. 6 and FIG. 9, in the default position of both control arms 18 and 20, are substantially the same such that the distal ends 32 thereof, are distanced and out of contact with either leaf spring 22. As shown in FIG. 6 and FIG. 9, and applicable to both control arms 18 and 20, the second control arm 20 is depicted having the distal end 32 a separation distance 36 or "D" from a contact with the factory leaf spring 22. Both control arms 18 and 20, as depicted by the second control arm 20 in FIG. 6, are maintained in this default position. The fixed connection of each torsion bar 12 and 14 to the center mount 16 or to the frame of the vehicle, will naturally limit the non-torsioned position of both. This in turn, limit the rotation of the first and second control arms 18 and 20 toward a respective leaf spring 22.

However, other means of limiting rotation of the engaged torsion bar 12 and 14 and resulting positioning of the respective first and second control arms 18 and 20 might be employed. For example rotation limiter on the frame 28 which contacts against a respective control arm 18 or 20, and prevents further rotation of the respective torsion bar 12 or 14. Such may be by for example a pin 13 positioned as a stop.

For additional means of adjustment of the separation distance D, a removable engagement to fixed positions of the control arms may be provided such as a splined connection 17 of the control arms 20 and 18, to their respective torsion bar 12 or 14. Such a splined connection 17 is well known and would allow for removal and fixed repositioning of the control arms 18 and 20 to their respective connections to splined ends of a torsion bar 12 and 14, to rotate them slightly to change or adjust the separation distance D as required. Of course other configurations to remove and re-engage the control arms to fixed positions on the torsion bars may be employed such as forming apertures in the control arms to match the shapes of the connecting ends of the torsion bars.

Preferably, this separation distance D is adjusted to a length substantially equal to or more than a length of extension of the dampening shaft 27 from the first and second hydraulic dampeners 24 and 26. Such allows the first and second hydraulic dampeners 24 and 26 to operate to allow travel of the dampening shaft 27 to fully dampen the resistive spring movement of the twisted torsion bars 12 and 14 fully. The operation of such hydraulic dampeners commonly known as shock absorbers is well known.

As also noted, this gap 36 in all modes of the system 10 herein is particularly preferred as a means to disconnect the system 10 from the vehicle stock suspension when the weight load has not deflected the leaf springs 22 to a point past their designed limit. Thus, when the vehicle is non-laden with excess weight, the factory suspension and wheel travel and factory shocks will operate as normal and as designed.

Once sufficient weight has been added to the vehicle, such as by a load in the bed of a truck, or the weight of a trailer tongue engaged to the vehicle, to move the leaf springs 22 to close the gap 36 each of the respective first control arm 18 and second control arm 20 will come into a contact at a respective distal end 32 thereof, with a respective leaf spring 22. Thereafter, further movement of the leaf springs 22 away from the roadway toward the top of the frame 28, will be subjected to a force exerted by the respective first torsion bar 12 and second torsion bar 14 which resists rotation of the respective first control arm 18 and second control arm 20. Adjustment of the resistance of the system 10 imparted to the leaf springs 22 may be accomplished by changing the length of the control arms 18 and 20 and/or the twisting resistance of the torsion bars 12 and 14. Such can be employed to adjust for more or less force imparted by the system 10 to the leaf springs 22, to accommodate anticipated excess weight loaded on the vehicle.

FIG. 7 depicts a perspective view of the system 10 herein employing torsion bars 12 and 14. This mode operates in the same fashion as above and simply shifts the position of engagement of the torsion bars 12 and 14 from a fixed connection to center mount 16, to a fixed connection with frame mounts 19 attached to the vehicle on mounting ends of each of the torsion bars 12 and 14. Consequently, the torsion bars 12 and 14 extend from fixed connections at respective engagement ends with frame mounts 19 to opposing ends operatively connected with a respective first control arm 18 and second control arm 20. As depicted in FIGS. 7-9, the system 10 operates in exactly the same fashion as noted above for the system 10 in FIGS. 1-6.

Shown in FIG. 8 is the system 10 herein of FIG. 7 in an opposite perspective view and depicts an enlarged view of a portion of the system 10. As can be seen in the enlarged view in FIG. 8, the second torsion bar 14 is connected with the second control arm 20 and positioned a default separation distance D, from the leaf spring 22 of the unloaded vehicle. Also shown is the hydraulic dampener 26 engaged at one end with the vehicle such as with the frame 28 and at the opposite end with the mounting member 34 which is connected to the second torsion bar 14. As noted operation of the system 10 in FIG. 7-9 is the same as the system 10 of FIGS. 1-6.

In FIG. 9 is depicted a plan view of the enlarged portion of FIG. 8. As shown the system 10 is in non operative mode where the leaf spring 22 has not been deflected by weight added to the vehicle and the separation distance D between the distal end 32 of the second control arm 20 is present thereby allowing the vehicle suspension to operate normally. Once weight is added to the vehicle sufficient to deflect the leaf spring 22 further than the separation distance D, the distal end 32 of the second control arm 20 will contact the leaf spring 22 and the system will operate as noted above. As already noted, the first torsion bar 12 connected to the first control arm 18 on the opposite side of the vehicle will operate in identical fashion.

It should be noted than any of the different depicted and described configurations of the system shown and described herein, can be employed with any other configuration or component shown and described as part of the system herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A vehicle overload suspension system, comprising:
a first torsion bar having a first control arm in an engagement thereto;
said first control arm having a distal end positioned a separation distance from a first leaf spring of a vehicle;
a second torsion bar having a second control arm spaced said separation distance from a second leaf spring of a vehicle;
a first hydraulic dampener in an engagement at a first end thereof with said first torsion bar and connected at a second end thereof to a first fixed connection with said vehicle; and a second hydraulic dampener in an engagement at a first end thereof with said second torsion bar and connected at a second end thereof to a first fixed connection with said vehicle; and said separation distance configuring said overload suspension system for operation only when said vehicle exceeds a weight load thereof which is sufficient to impart a deflection of said first leaf spring and said second leaf spring said separation distance, said deflection of said separation distance thereby causing contacts between said first leaf spring with said distal end of said first control arm, and said second leaf spring with said distal end of said second control arm.

2. The vehicle overload suspension system of claim 1, additionally comprising:

said engagement of said first control arm to said first torsion bar being a removable engagement to a first plurality of fixed positions therearound;

said engagement of said second control arm to said second torsion bar being a removable engagement to a second plurality of fixed positions therearound;

a positioning of both said first control arm to a respective one of said first plurality of positions, and said second control arm to a respective one of said second plurality of positions, defining an adjustment of said separation distance of both said first control arm from said first leaf spring and said second control arm from said second leaf spring.

3. The vehicle overload suspension system of claim 1, additionally comprising:

said engagement of said first control arm to said first torsion bar being a removable engagement to a first plurality of fixed positions therearound;

said engagement of said second control arm to said second torsion bar being a removable engagement to a second plurality of fixed positions therearound;

a positioning of both said first control arm to a respective one of said first plurality of positions, and said second control arm to a respective one of said second plurality of positions, defining an adjustment of said separation distance of both said first control arm from said first leaf spring and said second control arm from said second leaf spring.

4. The vehicle overload suspension system of claim 1, additionally comprising:

said first hydraulic dampener having a first dampening shaft in a translating engagement therewith;

said engagement of said first end of said first hydraulic dampener to said first torsion bar being an engagement of said first dampening shaft to a first mounting member which extends from a connection to said first torsion bar;

said second hydraulic dampener having a second dampening shaft in a translating engagement therewith; and said engagement of said first end of said second hydraulic dampener to said second torsion bar being an engagement of said second dampening shaft to a second mounting member which extends from a connection to said second torsion bar.

5. The vehicle overload suspension system of claim 3, additionally comprising:

said first hydraulic dampener having a first dampening shaft in a translating engagement therewith;

said engagement of said first end of said first hydraulic dampener to said first torsion bar being an engagement of said first dampening shaft to a first mounting member which extends from a connection to said first torsion bar;

said second hydraulic dampener having a second dampening shaft in a translating engagement therewith; and said engagement of said first end of said second hydraulic dampener to said second torsion bar being an engagement of said second dampening shaft to a second mounting member which extends from a connection to said second torsion bar.

6. An overload suspension system, comprising:

said overload suspension system configured for engagement to a vehicle having a first leaf spring and second leaf spring;

said overload suspension system having a first torsion bar having a first control arm engaged at a first end thereof with said first torsion bar, said first control arm extending to a distal end;

said overload suspension system having a second torsion bar having a second control arm engaged at a first end thereof with said second torsion bar, said second control arm extending to a distal end;

said distal end of said first control arm positioned a separation distance from said first leaf spring of a vehicle;

said distal end of said second torsion bar positioned said separation distance from said second leaf spring of said vehicle;

a first hydraulic dampener in an engagement at a first end thereof with said first torsion bar and connected at a second end thereof to a first fixed connection with said vehicle;

a second hydraulic dampener in an engagement at a first end thereof with said second torsion bar and connected at a second end thereof to a first fixed connection with said vehicle; and said separation distance configuring said overload suspension system for operation only when said vehicle exceeds a weight load thereof which is sufficient to impart a deflection of said first leaf spring and said second leaf spring said separation distance, said deflection of said separation distance thereby causing contacts between said first leaf spring with said distal end of said first control arm, and said second leaf spring with said distal end of said second control arm.

7. The overload suspension system of claim 6, additionally comprising:

said engagement of said first end of said first control arm to said first torsion bar being a removable engagement to a first plurality of fixed positions therearound;

said engagement of said first end of said second control arm to said second torsion bar being a removable engagement to a second plurality of fixed positions therearound;

a positioning of both said first control arm to a respective one of said first plurality of positions, and said second control arm to a respective one of said second plurality of positions, defining an adjustment of said separation distance of both said first control arm from said first leaf spring and said second control arm from said second leaf spring.

* * * * *